United States Patent
Gong et al.

(10) Patent No.: US 9,574,943 B2
(45) Date of Patent: Feb. 21, 2017

(54) INDICATOR LIGHT DETECTION SYSTEM AND METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Wei-Ying Gong, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 14/684,636

(22) Filed: Apr. 13, 2015

(65) Prior Publication Data

US 2016/0217671 A1    Jul. 28, 2016

(30) Foreign Application Priority Data

Jan. 27, 2015  (CN) .......................... 2015 1 0039958

(51) Int. Cl.
*B60Q 1/00* (2006.01)
*G01J 3/50* (2006.01)
*G08B 1/08* (2006.01)

(52) U.S. Cl.
CPC ........ *G01J 3/505* (2013.01); *G08B 1/08* (2013.01)

(58) Field of Classification Search
CPC ....................................... G08B 21/18
USPC ........ 340/540, 691.1, 691.6, 5.1, 322, 815.4
See application file for complete search history.

(56) References Cited

U.S. PATENT DOCUMENTS

| 6,628,203 | B1 * | 9/2003 | Oost ..................... | G06F 11/324 340/500 |
| 7,123,165 | B2 * | 10/2006 | Davenport ............ | B61L 5/1881 246/473 R |
| 7,154,403 | B2 * | 12/2006 | Davenport ............ | B61L 5/1881 246/473 R |

* cited by examiner

*Primary Examiner* — Toan N Pham
(74) *Attorney, Agent, or Firm* — Zhigang Ma

(57) ABSTRACT

An indicator light detection system includes a detection module and a processing module. The detection module is configured to sense a color of a first indicator light to receive a first color signal. The detection module is further configured to output a first detection signal corresponding to the first color signal. The processing module includes a resolving unit, a comparison unit, and a display unit. The resolving unit is configured to resolve the first detection signal to a first detection value. The comparison unit is configured to compare the first detection value with a first reference value. The display unit is configured to display information when the first detection value is equal to the first reference value. An indicator light detection method is also provided.

20 Claims, 4 Drawing Sheets

INDICATOR LIGHT DETECTION SYSTEM AND METHOD

FIELD

The subject matter herein generally relates to detection systems.

BACKGROUND

A detection system can be used to detect whether an indicator light is lit.

BRIEF DESCRIPTION OF THE DRAWINGS

Implementations of the present technology will now be described, by way of example only, with reference to the attached figures.

DETAILED DESCRIPTION

Figure 1:
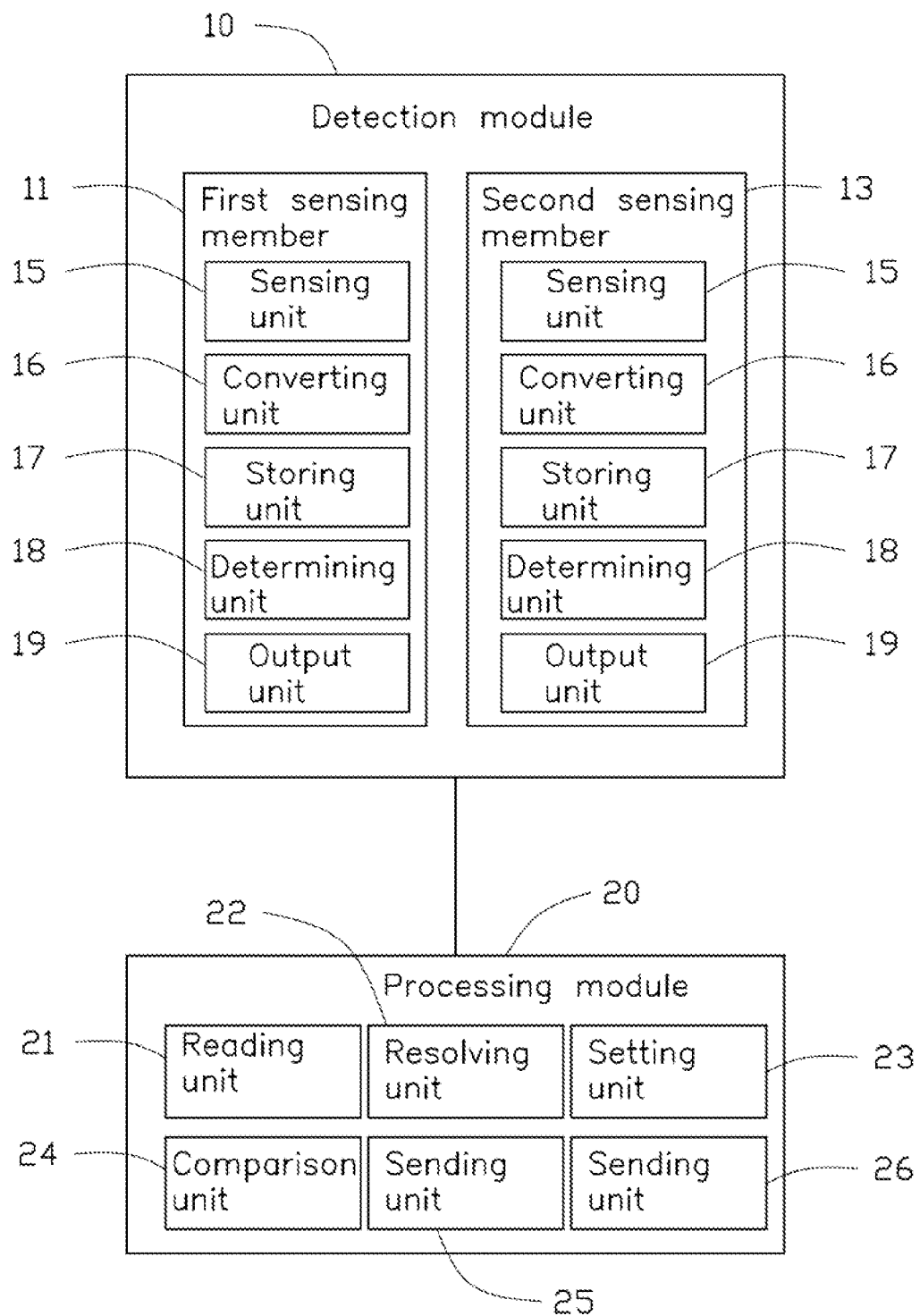
FIG. 1 is a block diagram of one embodiment of an indicator light detection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a detection system to detect whether indicator lights are lit.

FIG. 1 illustrates an embodiment of an indicator light detection system. The indicator light detection system comprises a detection module 10 and a processing module 20. The detection module 10 comprises a first sensing member 11 and a second sensing member 13. Each of the first sensing member 11 and the second sensing member 13 comprises a sensing unit 15, a converting unit 16, a storing unit 17, a determining unit 18, and an output unit 19. The sensing unit 15 is configured to sense a color to receive a color signal. The converting unit 16 is configured to convert the color signal to a sensing value. The storing unit 17 is configured to store a predetermined scope. The determining unit 18 is configured to determine whether the sensing value is within the predetermined scope. The output unit 19 is configured to output a detection signal.

In at least one embodiment, each of the first sensing member 11 and the second sensing member 13 is a color sensor.

The processing module 20 comprises a reading unit 21, a resolving unit 22, a setting unit 23, a comparison unit 24, a sending unit 25, and a display unit 26. The reading unit 21 is configured to read the detection signal. The resolving unit 22 is configured to resolve the detection signal to a detection value. The setting unit 23 is configured to set a plurality of reference values. The comparison unit 24 is configured to compare the detection value with the one corresponding reference value. The sending unit 25 is configured to send successful information. The display unit 26 is configured to display a result.

Figure 2:
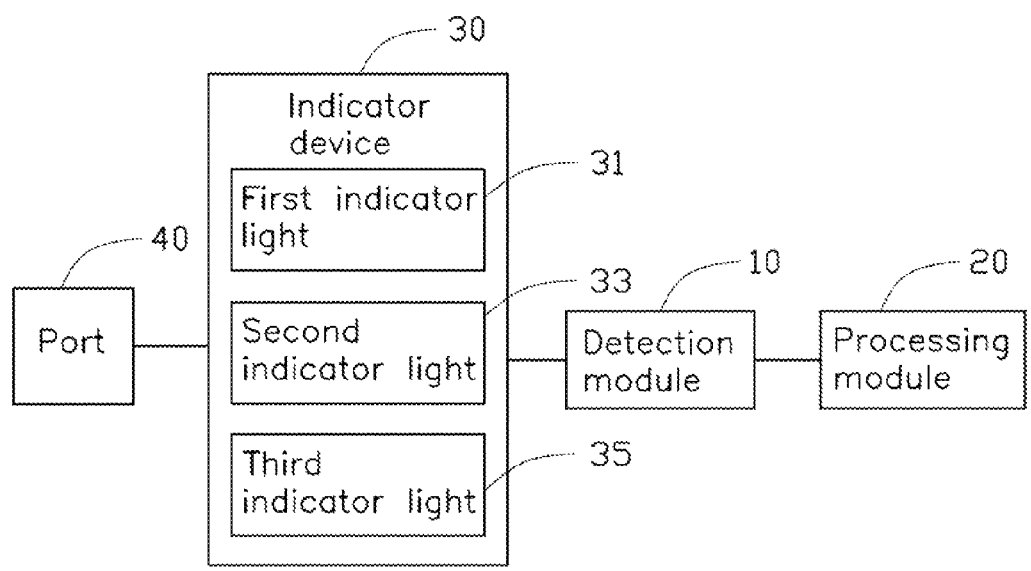
FIG. 2 is a block diagram of one embodiment of the indicator light detection system used in a computer.

FIG. 2 illustrates that in at least one embodiment, the indicator light detection system is used in a computer. The computer comprises an indicator device 30 and a port 40. The port 40 is configured to receive a network. The sensing unit 15 is configured to sense a color of the indicator device 30 to receive a color signal. The indicator device 30 comprises a first indicator light 31, a second indicator light 33, and a third indicator light 35. A color of the first indicator light 31 is yellow when the port 40 is connected from the network. When the port 40 receives a first wire speed value the second indicator light 33 is lit green and the third indicator light 35 does not light. When the port 40 receives a second wire speed value the third indicator light 35 is lit orange and the second indicator light 33 does not light.

Figure 3:
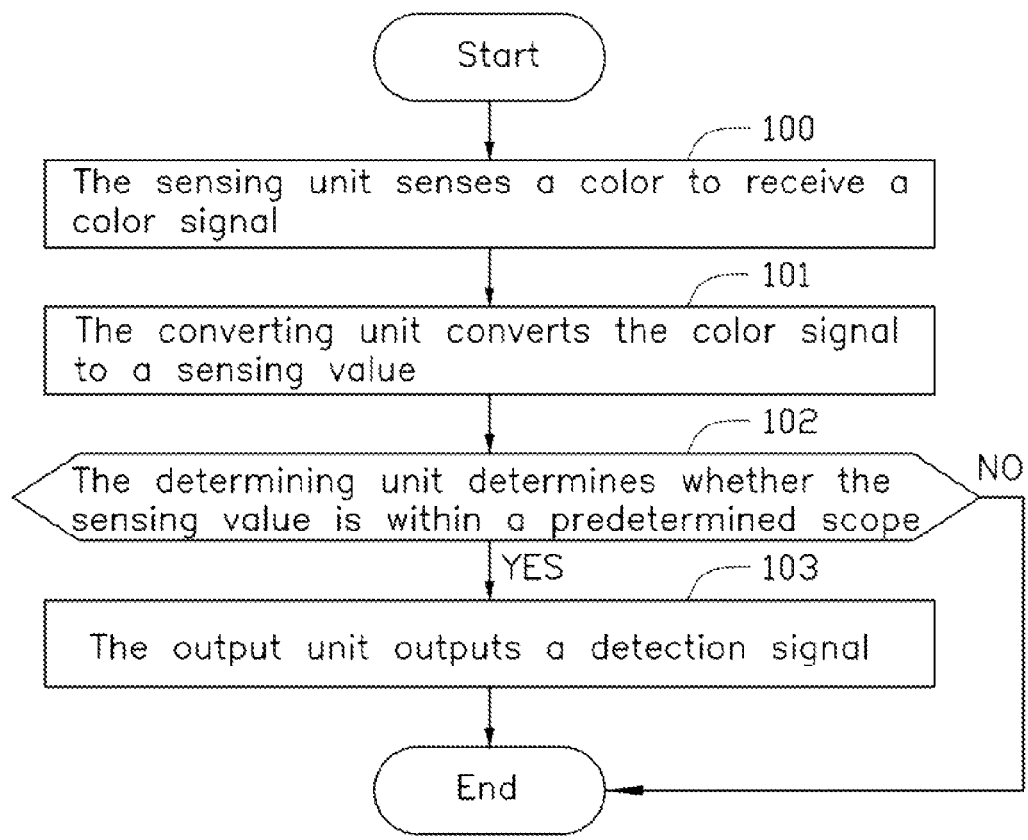
FIG. 3 is a flow chart of one embodiment of a detection step of an indicator light detection method.

FIG. 3 illustrates a flowchart in accordance with an example embodiment. A detection step of an indicator light detection method is provided by way of example, as there are a variety of ways to carry out the method. The indicator light detection method described below can be carried out using the configurations illustrated in FIGS. 1 and 2, for example, and various elements of these figures are referenced in explaining indicator light detection method. Each block shown in FIG. 3 represents one or more processes, methods, or subroutines carried out in the indicator light detection method. Furthermore, the illustrated order of blocks is by example only and the order of the blocks can change. Additional blocks may be added or fewer blocks may be utilized, without departing from this disclosure. The indicator light detection method can begin at block 100.

At block 100, the sensing unit 15 senses a color to receive a color signal.

At block 101, the converting unit 16 converts the color signal to a sensing value.

At block 102, the determining unit 18 determines whether the sensing value is within a predetermined scope, if yes, the method goes to block 103; if no, the method goes to end.

At block 103, the output unit 19 outputs a detection signal.

Figure 4:
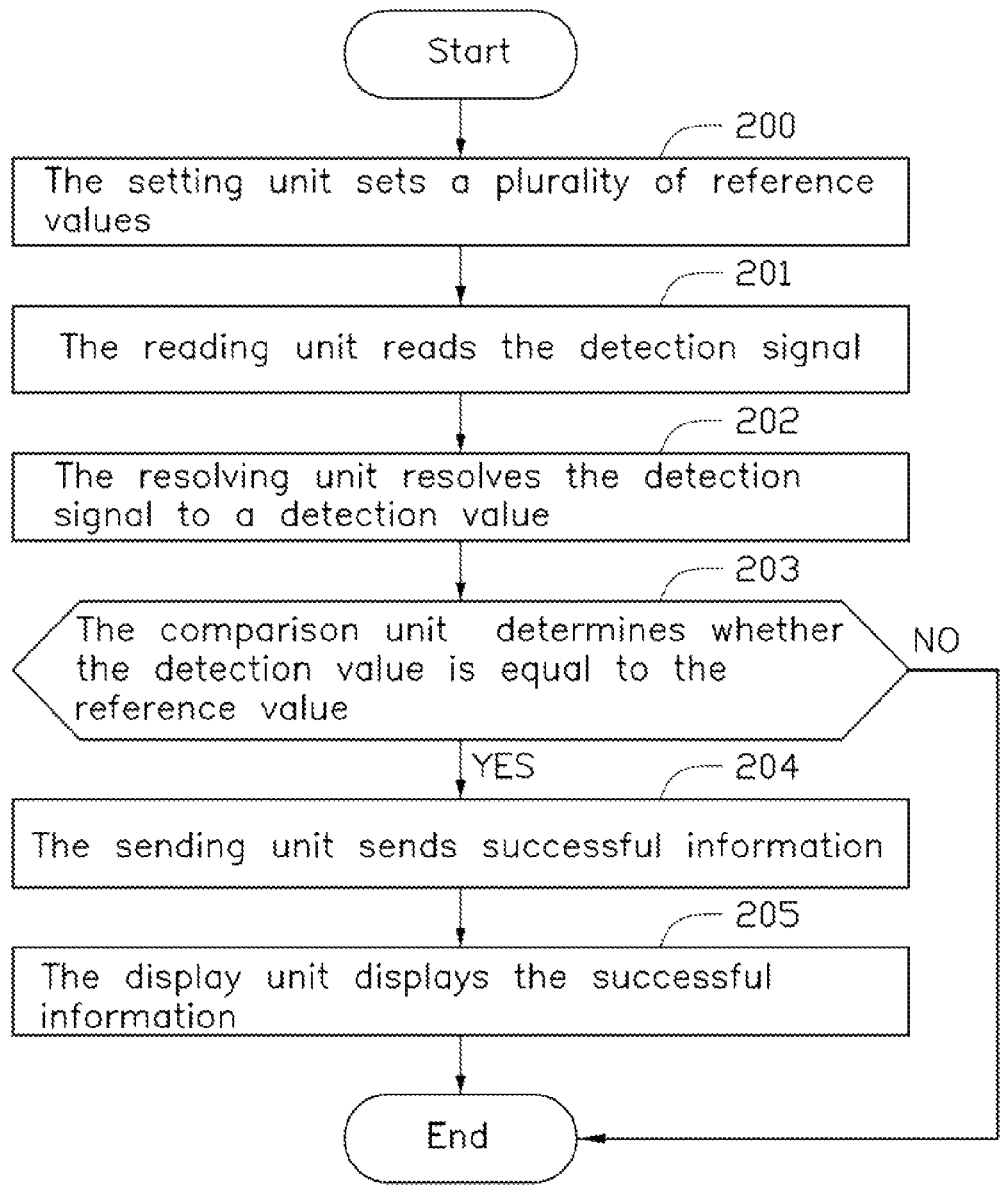
FIG. 4 is a flow chart of one embodiment of a processing step of the indicator light detection method.

FIG. 4 illustrates a flowchart in accordance with an example embodiment. A processing step of an indicator light detection method is provided by way of example, as there are a variety of ways to carry out the method. The indicator light detection method described below can be carried out using the configurations illustrated in FIGS. 1 and 2, for example, and various elements of these figures are referenced in explaining indicator light detection method. Each block shown in FIG. 3 represents one or more processes, methods, or subroutines carried out in the indicator light detection method. Furthermore, the illustrated order of blocks is by example only and the order of the blocks can change. Additional blocks may be added or fewer blocks may be utilized, without departing from this disclosure. The indicator light detection method can begin at block 200.

At block 200, the setting unit 23 sets a plurality of reference values.

At block 201, the reading unit 21 reads the detection signal.

At block 202, the resolving unit 22 resolves the detection signal to a detection value.

At block 203, the comparison unit 24 compares the detection value with a reference value and determines whether the detection value is equal to the reference value, if yes, the method goes to block 204; if no, the method goes to end.

At block 204, the sending unit 25 sends successful information.

At block 205, the display unit 26 displays the successful information.

In the embodiment, when the first indicator light 31 is yellow, the sensing unit 15 of the first sensing member 11 receives a first color signal after sensing yellow. The converting unit 16 of the first sensing member 11 converts the first color signal to a first sensing value. The determining unit 18 of the first sensing member 11 determines the first sensing value is within the predetermined scope. The output unit 19 of the first sensing member 11 outputs a first detection signal. The reading unit 21 reads the first detection signal. The resolving unit 22 resolves the first detection signal to a first detection value. The comparison unit 24 compares the first detection value with the first reference value. The display unit 26 displays the successful information when the first detection value is equal to the first reference value.

When the second indicator light 33 is lit green and the sensing unit 15 of the second sensing member 13 receives a second color signal after sensing the green. The converting unit 16 of the second sensing member 13 converts the second color signal to a second sensing value. The determining unit 18 of the second sensing member 13 determines the second sensing value is within the predetermined scope. The output unit 19 of the second sensing member 13 outputs a second detection signal. The reading unit 21 reads the second detection signal. The resolving unit 22 resolves the second detection signal to a second detection value. The comparison unit 24 compares the second detection value with the second reference value. The display unit 26 displays the successful information and displays a first wire speed value when the second detection value is equal to the second reference value.

When the third indicator light 35 is lit orange and the sensing unit 15 of the second sensing member 13 receives a third color signal after sensing the orange. The converting unit 16 of the second sensing member 13 converts the third color signal to a third sensing value. The determining unit 18 of the second sensing member 13 determines the third sensing value is in the predetermined scope. The output unit 19 of the second sensing member 13 outputs a third detection signal. The reading unit 21 reads the third detection signal. The resolving unit 22 resolves the third detection signal to a third detection value. The comparison unit 24 compares the third detection value with the third reference value. The display unit 26 displays the successful information and displays a second wire speed value when the third detection value is equal to the third reference value.

In the indicator light detection and method, the detection module 10 outputs one corresponding detection signal after detecting a color of the first indicator light 31. The processing module 20 determines whether the network is normal according to the detection signal and the processing module 20 displays a result. The processing module 20 determines the wire speed value according the detection signal output by the detection module 10 after the detection module 10 detects the second indicator light 33 and the third indicator light 35 is lit. The processing module 20 displays a wire speed value.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. An indicator light detection system comprising:
    a detection module configured to:
        couple to an indicator device;
        sense a color of a first indicator light of the indicator device to receive a first color signal,
        convert the first color signal to a first sensing value, and
        output a first detection signal when it is determined that the first sensing value is within a predetermined scope; and
    a processing module coupled to the detection module and comprising:
        a resolving unit configured to resolve the first detection signal to a first detection value,
        a comparison unit configured to compare the first detection value with a first reference value, and
        a display unit configured to display information when the detection value is equal to the reference value.

2. The indicator light detection system of claim 1, wherein the processing module further comprises a reading unit, the reading unit is configured to read the first detection signal, and the resolving unit is configured to resolve the first detection signal after the reading unit read the first detection signal.

3. The indicator light detection system of claim 2, wherein the processing module further comprises a sending unit and the sending unit is configured to send the information to the display unit when the first detection value is equal to the first reference value.

4. The indicator light detection system of claim 3, wherein the detection module comprises a first sensing member, the first sensing member is configured to sense the color of the first indicator light and is configured to output the first detection signal, the comparison unit is configured to compare the first detection value with a first reference value, and the display unit is configured to display information when the first detection value is equal to the first reference value.

5. The indicator light detection system of claim 4, wherein the detection module further comprises a second sensing member, the second sensing member is configured to sense a color of a second indicator light of the indicator device and is configured to output a second detection signal, the resolving unit is configured to resolve the second detection signal to a second detection value, the comparison unit is further configured to compare the second detection value with a second reference value, and the display unit is further configured to display a first wire speed value when the second detection value is equal to the second reference value.

6. The indicator light detection system of claim 5, wherein the second sensing member is further configured to sense a color of a third indicator light of the indicator device and is configured to output a third detection signal, the resolving unit is configured to resolve the third detection signal to a third detection value, the comparison unit is further configured to compare the third detection value with a third reference value, and the display unit is further configured to display a second wire speed value when the third detection value is equal to the third reference value.

7. The indicator light detection system of claim 4, wherein the first sensing member is a color sensor.

8. The indicator light detection system of claim 1, wherein the detection module comprises a converting unit and an output unit, the converting unit is configured to convert the first color signal to the first sensing value, and the output unit is configured to output the first detection signal according to the first sensing value.

9. The indicator light detection system of claim 8, wherein the detection module further comprises a sensing unit and the sensing unit is configured to sense the color of the first indicator light to receive the first color signal.

10. The indicator light detection system of claim 8, wherein the detection module further comprises a determining unit, the determining unit is configured to determines whether the first sensing value is within the predetermined scope, and the output unit is configured to output the first detection signal when the first sensing value is within the predetermined scope.

11. An indicator light detection system comprising:
a detection module configured to:
couple to an indicator device;
sense a color of a first indicator light of the indicator device to receive a first color signal,
convert the first color signal to a first sensing value, and
output a first detection signal when it is determined that the first sensing value is within a predetermined scope; and
a processing module coupled to the detection module and comprising:
a resolving unit,
a comparison unit, and
a display unit;
wherein the detection module comprises a converting unit configured to convert the first color signal to a first sensing value and output a first detection signal;
wherein the resolving unit is configured to resolve the first detection signal to a first detection value;
wherein the comparison unit is configured to compare the first detection value with a first reference value; and
wherein the display unit is configured to display information when the first detection value is equal to the first reference value.

12. The indicator light detection system of claim 11, wherein the processing module further comprises a reading unit, the reading unit is configured to read the first detection signal, and the resolving unit is configured to resolve the first detection signal after the reading unit read the first detection signal.

13. The indicator light detection system of claim 12, wherein the processing module further comprises a sending unit and the sending unit is configured to send the information to the display unit when the first detection value is equal to the first reference value.

14. The indicator light detection system of claim 13, wherein the detection module comprises a first sensing member, the first sensing member is configured to sense the color of the first indicator light and is configured to output the first detection signal, the comparison unit is configured to compare the first detection value with a first reference value, and the display unit is configured to display successful information when the first detection value is equal to the first reference value.

15. The indicator light detection system of claim 14, wherein the second sensing member is a color sensor.

16. The indicator light detection system of claim 11, wherein the detection module comprises a converting unit and an output unit, the converting unit is configured to convert the first color signal to the first sensing value, and the output unit is configured to output the first detection signal according to the first sensing value.

17. The indicator light detection system of claim 16, wherein the detection module further comprises a sensing unit and the sensing unit is configured to sense the color of the first indicator light to receive the first color signal.

18. The indicator light detection system of claim 16, wherein the detection module further comprises a determining unit, the determining unit is configured to determines whether the first sensing value is within the predetermined scope, and the output unit is configured to output the first detection signal when the first sensing value is within the predetermined scope.

19. An indicator light detection method comprising:
receiving a color signal after sensing a color of an indicator light of an indicator device by a sensing unit;
convert the first color signal to a first sensing value;
determining whether the first sensing value is within a predetermined scope;
outputting a detection signal corresponding to the color signal by an output unit when the first sensing value is within the predetermined scope;
resolving the first detection signal to a detection value by a resolving unit;
comparing the detection value with a reference value by a comparison unit; and
displaying information by a display unit when the detection value being equal to the reference value.

20. The indicator light detection method of claim 19, further comprising a step of reading the first detection signal by a reading unit after outputting the detection signal.

* * * * *